UNITED STATES PATENT OFFICE.

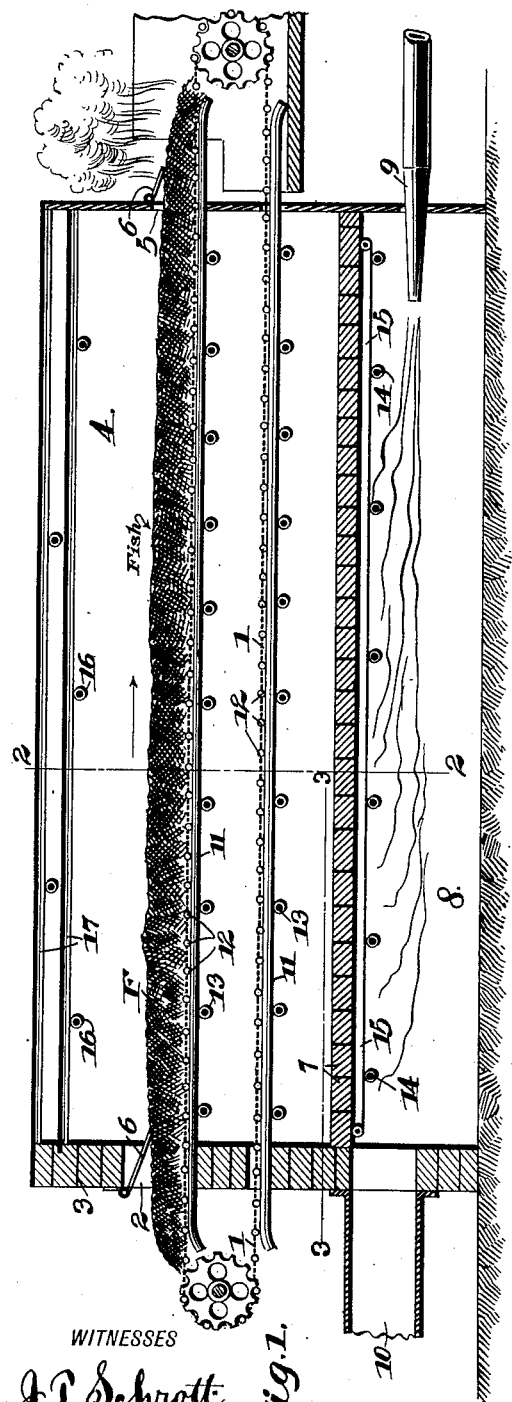
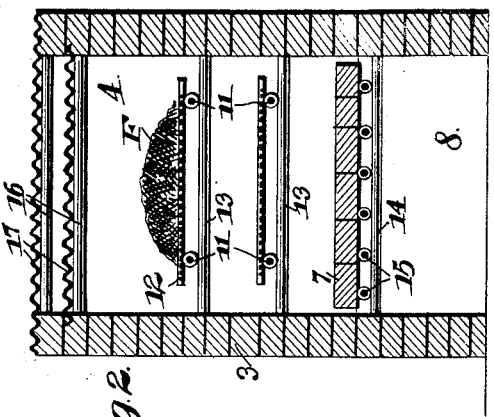

ARTHUR SCOVILL DAVIES, OF SANTA CRUZ, CALIFORNIA.

FISH-COOKER.

1,391,821.  Specification of Letters Patent.  Patented Sept. 27, 1921.

Application filed December 26, 1918. Serial No. 268,359.

*To all whom it may concern:*

Be it known that I, ARTHUR S. DAVIES, a citizen of the United States, and a resident of Santa Cruz, in the county of Santa Cruz and State of California, have invented certain new and useful Improvements in Fish-Cookers, of which the following is a specification.

My invention relates to improvements in cooking apparatus, and it consists in the constructions, combinations and arrangements herein described and claimed.

An object of my invention is to provide a cooking apparatus to be used in connection with fish canneries, an endless belt traveling through a cooking chamber being employed to convey and continuously cook the fish.

Another and important object of the invention is to provide a screen of porous material between the fire chamber and cooking chamber, to hold down the flames and absorb the oil drippings from the fish.

Other objects and advantages will appear in the following specification, reference being had to the accompanying drawing in which:—

Figure 1 is a longitudinal section of the improved fish cooker,

Fig. 2 is a cross section on the line 2—2 of Fig. 1, and

Fig. 3 is a section on the line 3—3 of Fig. 1.

By way of introduction, the specific purpose of the invention should be explained and understood. It is perhaps the universal custom in fish canneries at present, to boil the fish in a large vat of oil before they are packed in the tins. In the interests of economy, sometimes as many as two or three hundred tons of fish are boiled in the same oil with the result that by the time the oil has been used to cook about half of the quantity of fish, it becomes very impure so that the resultant product is not altogether wholesome. All of the objectionable features of the present method are overcome by the improved cooker and attention is therefore directed to the drawing.

The fish F are loaded on the endless conveyer 1 at the entrance 2 of the oven 3, and are then slowly conveyed through the cooking chamber 4, finally coming out of the exit 5 where they are taken off and disposed of. Both the entrance and exit are provided with trap doors 6 of any suitable design, the function of the trap doors being to prevent the escape of heat out of the openings.

A fire screen 7 of porous material, separates the cooking chamber 4 from the fire chamber 8. The screen holds down the flame of the burner 9, and being of porous material such as brick, etc., absorbs the oil drippings from the fish. The sides of the screen 7 are spaced from the side walls of the oven to provide heat and flame passages. This arrangement aids in disposing of the oil drippings by burning them as they accumulate on top of the screen. Heat in the fire chamber may be generated by means other than the burner 9. Coal or electricity may be used if desired. In the present instance the flue 10 carries off the products of combustion.

Longitudinal rails 11 support the ends of the cross rods 12 of the conveyer as clearly shown in Fig. 2. The belt 1 is made of rather close mesh wire so that the fish cannot drop through. The rails 11 in turn are supported by cross bars 13 that extend across the oven. Similar bars 14 support the coils 15 on which the fire screen 7 is laid.

Water is circulated through the coils 15 to prevent them from burning out and at the same time to convey a part of the heat away for other purposes such as drying. Other cross bars 16 support the double roof 17 of the oven. This roof may consist of corrugated iron or other suitable material. In conclusion it may be stated that instead of piling the fish on the conveyer as shown in Fig. 1, they may be placed in wire baskets. This is simply a matter of convenience in handling the fish, and since it does not relate directly to the invention itself has not been deemed necessary to illustrate.

While the construction and arrangement of the cooker is that of a generally preferred form, obviously modifications and changes may be made without departing from the spirit of the invention or the scope of the claims.

I claim:—

1. A fish cooker, comprising a suitable oven, with upper entrance and exit openings, having a pair of rails projecting therethrough, and trap doors providing closures; lower smaller openings, with a pair of rails projecting therethrough; an endless sprocket-driven wire mesh fish conveyer, with cross rods bracing the conveyer against sagging, and sliding on the various rods for support; a partition beneath which there is a suitable heat producing means, of absorbent material to catch oil drippings, slightly spaced from the oven sides to provide heat passages; and supporting means for the partition, including a pipe coil which contains water for the conduction of heat to all corners and to provide an even temperature distribution.

2. In a fish cooker, an oven including a fire chamber, a baking chamber in which fish carrying means operates, a partition defining the two chambers, spaced from certain oven walls to produce passages for heat from the fire chamber, and means supporting the partition, conducting fluid to equalize the heat in all corners of the oven.

3. A fish cooker, comprising an oven with a plurality of cross rods in longitudinal series, a water coil supported by the lowermost series, in turn supporting a partition to define a lower fire chamber and an upper baking chamber, the partition being spaced from certain walls to leave heat passages; rails supported by other bar series, an endless mesh conveyer with cross rods having ends sliding on the rails; and a roof for the oven, including a plurality of plates supported on other bar series.

ARTHUR SCOVILL DAVIES.